No. 682,461. Patented Sept. 10, 1901.
J. T. FANNING.
TRANSMITTING DYNAMOMETER.
(Application filed Sept. 4, 1900.)
(No Model.) 2 Sheets—Sheet 1.

Witnesses.

Inventor.
John T. Fanning.

No. 682,461. Patented Sept. 10, 1901.
J. T. FANNING.
TRANSMITTING DYNAMOMETER.
(Application filed Sept. 4, 1900.)
(No Model.) 2 Sheets—Sheet 2.
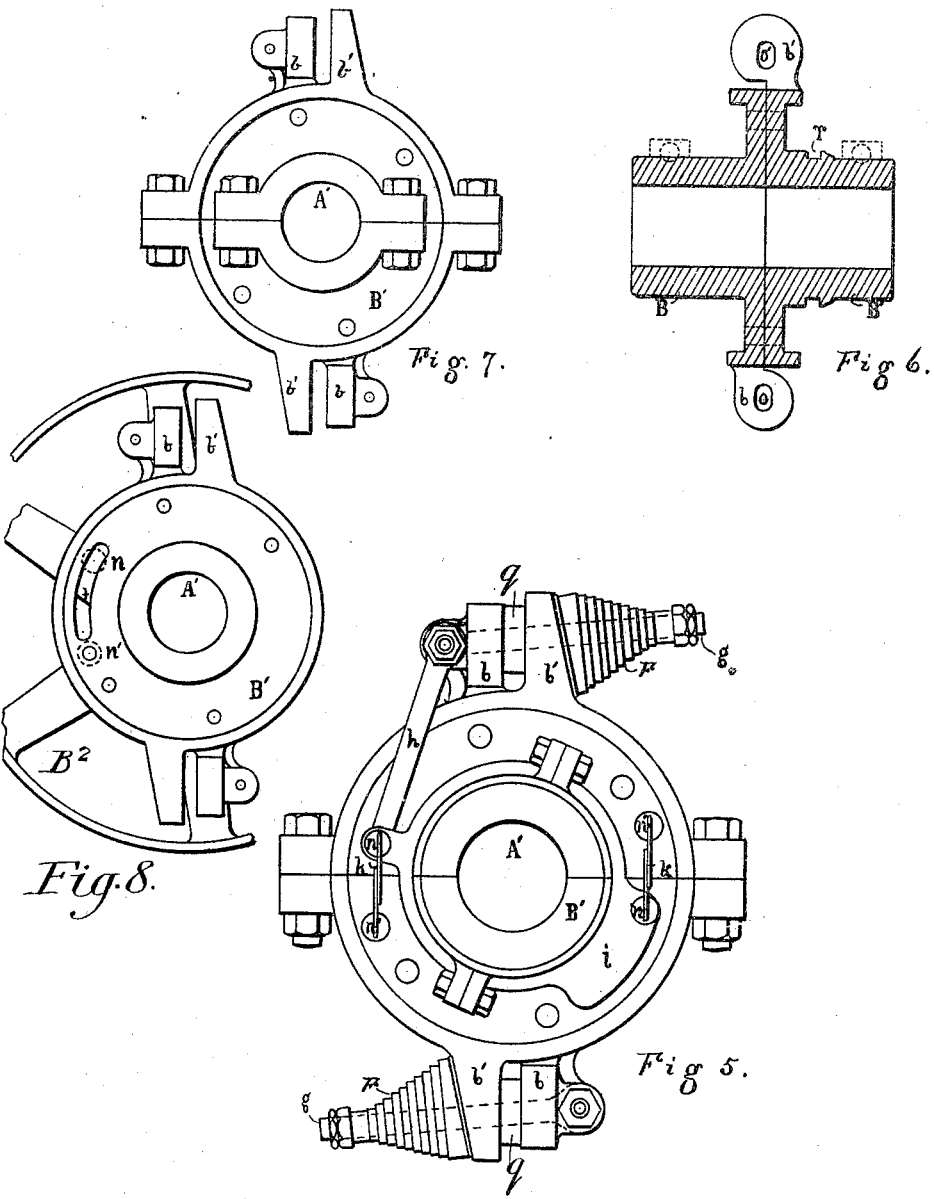

UNITED STATES PATENT OFFICE.

JOHN T. FANNING, OF MINNEAPOLIS, MINNESOTA.

TRANSMITTING-DYNAMOMETER.

SPECIFICATION forming part of Letters Patent No. 682,461, dated September 10, 1901.

Application filed September 4, 1900. Serial No. 28,936. (No model.)

*To all whom it may concern:*

Be it known that I, JOHN T. FANNING, of the city of Minneapolis, county of Hennepin, State of Minnesota, have invented certain Improvements in Transmitting-Dynamometers, of which the following is a specification.

My invention relates to an improvement in means for indicating the power transmitted through a pair of coupling halves of shafts of the class that are flexibly connected together by means of adjusted springs and links, so as to constitute a flexible coupling.

The object of my invention is to provide in connection with such spring-connected couplings or pulleys an improved means of reading the torsional force transmitted through said couplings as indicated by the relative angular positions of the couplings when in work and of reading the speed of revolutions of said couplings and to adapt such flexible couplings with their attached improved indicating devices to become an improved rotary transmitting dynamometrical instrument.

My improved means for showing by a sight-reading scale the horse-powers or other units of power transmitted at any instant and showing by a sight-reading scale the rate of revolutions of said shaft at the same instant are hereinafter described and are illustrated in the accompanying drawings, in which—

Figure 4:
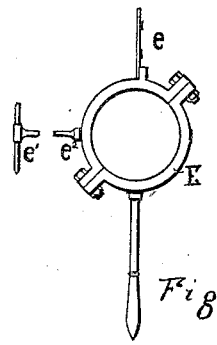
Figure 3:
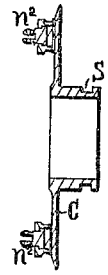
Figure 2:
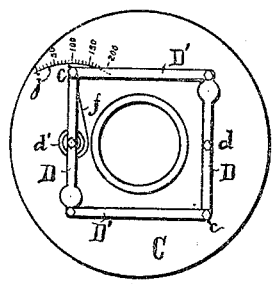
Figure 1:
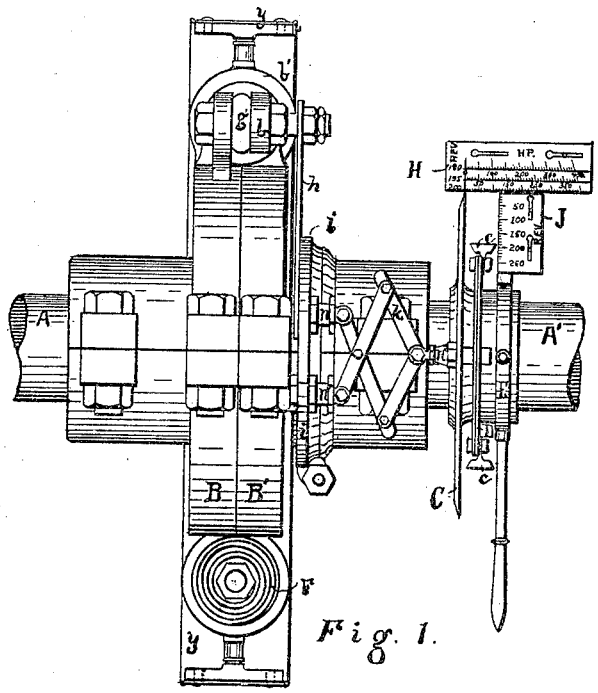

Figure 1 is a general side elevation of the complete dynamometer. Figs. 2 and 3 are an elevation and section of the sliding and revolving indicating-disk. Fig. 4 is a loose collar riding in a groove in the indicator-disk and supports a revolution-scale and a pen for continuously recording the horse-powers or other units of power transmitted. Fig. 5 is a general elevation at right angles to the shaft of one representative form of the flexibly-connected coupling halves and of connecting mechanisms. Figs. 6 and 7 show details of construction of one representative form of the flexible coupling, and Fig. 8 shows a pulley $B^2$ when flexibly connected to the coupling half B'.

In Fig. 1, A is a rotating shaft conveying power from a turbine steam-engine or other source of power, (not shown,) and A' is a rotating shaft receiving and transmitting power from the shaft A and delivering it to one or more mechanisms or to another shaft, as required. B is one half of the flexible coupling, fixed upon the shaft A, and B' is the other half of the coupling, fixed upon the shaft A'. These coupling halves are flexibly connected by means of the spring F and links $g$. The shaft-coupling, in the representative form shown, is quite similar to the well-known standard cast-plate coupling, except that it has lugs $b$ and $b'$ cast on the rims of the respective halves, as shown in Figs. 1, 5, 6, and 7. The lugs $b$ and $b'$ carry springs F F and links $g\ g$, Figs. 1 and 5. The couplings may or may not be surrounded by an inclosing rim $y$, Fig. 1. When rotative force comes from the shaft A and through the coupling half B and lugs $b\ b$, it is transmitted through the links $g\ g$ and compresses the springs F F until the compressive force balances the resistance to rotation of the shaft A' and its coupling half B' and lugs $b'\ b'$. The two shafts then rotate in synchronism. The compression of the adjusted springs F F and the relative angular movement between the couplings are in precise proportion to the rotative force transmitted through them from shaft A to shaft A'.

In Figs. 1, 8, and 5, $n\ n$ are studs fixed in the loose collar $i$, and in said figures $n'\ n'$ are studs fixed in the coupling-half B', and in Figs. 1 and 3 $n^2\ n^2$ are studs fixed in the loose disk C. The heads of these studs may move in slight rotation independently of their fastenings, as is shown in Fig. 3.

In Figs. 1 and 5, $h$ is a stiff link which connects the coupling-lug $b$ with the loose collar $i$ and transmits positively each angular motion of the coupling-lug $b$ to the collar $i$ and studs $n\ n$. The connecting-link $h$ gives to the studs $n$ and $n'$ the counterpart but inverse relative angular motions made by the coupling-lugs $b$. The relative angular movements between the studs $n$ and $n'$ are therefore, as well as similar movements between $b$ and $b'$, in precise proportion to the rotative force transmitted through the coupling-halves B and B' and their lugs $b$ and $b'$. Freedom in slight side motions of the link $h$ provides for slight variations in the line of axes of shafts A and A' and for slight end motions of the shafts.

In Fig. 1, $k$ is a lazy-tongs connected at one end to the studs $n'$ and $n$ on the coupling half B and collar $i$ and at the other end to the studs $n^2$ on the disk C. By means of the lazy-tongs $k$ the angular motions of the studs $n$ and $n'$ are converted into a right-line motion parallel with the axis of the shaft A' and given to the fixed stud $n^2$, and thus a sliding motion is given to the disk C along the shaft A', which sliding right-line motion is in precise proportion to the rotative force transmitted through and to the relative angular motions of the coupling halves B and B'. The edge of the disk may be serrated, as in spider form, with edges sharp and concentric with the shaft.

In Fig. 1, H is a sight-reading scale graduated to read horse-powers transmitted at given rates of revolution of the shaft A' or to read such other units as the circumstances require. The scale H is attached to some substantially fixed support independent of the shaft, but is so attached as to be adjustable in position. The graduations of the scale may be upon metal, wood, or other suitable material. The scale is readily interchangeable by substitution with other scales of different units or of other rates of standard revolutions, and its usual markings cover the usual allowance of variations of speed from the normal speed. The scale H is set so that the indicating-disk C marks zero when no power is being transmitted by the shaft A'. The marking of the scale H may be proved, or may even be precisely graduated, by applying known weights to a quadrant fixed on and deflecting in rotation the shaft A' while shaft A is held fast. The graduated edge of the scale H is set parallel with the shaft A' and close to the sharp edge of the indicating-disk C, so that very precise readings of the power-scale H may be made. If in special cases the speeds of revolution have considerable variation, then the scale H may be graduated for one hundred revolutions, and then when the speed is, say, twenty per cent. greater or ten per cent. less than one hundred revolutions the power indicated by scale H is increased twenty per cent. or reduced ten per cent., as the case may be.

In Figs. 1 and 2, D D and D' D' are connected bars in balance attached to the indicating-disk C by stud-pins $d$ and $d'$ and so connected that they may partially rotate as parallel bars about the stud-pins. One half of each bar D D is heavier than the other half, so that when the disk C carrying them is rotated with the shaft A' centrifugal force tends to move the heavier ends of the bars toward the outer edge of the disk. Such movement of the parallel bars about the axes $d$ and $d'$ is in part resisted by an adjusted spring $f$, attached to the stud $d'$. At one or more of the four exterior joints of the parallel bars is a finger $c$ $c$, which moves along a scale $j$ of revolutions marked on the face of the disk C. The spring $f$ moves the fingers $c$ $c$ toward the circumference of the disk C when the rate of revolutions is low, and centrifugal force acting on the bars moves the same fingers toward the center of the disk. The circular movement of the finger $c$ along the revolution-scale $j$ is in proportion to the rate of revolutions of the disk C rotating with the shaft A'. In the above-described radial movement of the fingers $c$ $c$ their points pass also along a scale J of revolutions attached to a loose collar E, Figs. 1 and 4, set in a concentric groove $s$, Fig. 3, in the hub of the disk C. The scale J is carried by the finger $e$, rigidly attached to the collar E, and J is adjustable in position. The scale $j$ may be read at moderate rates and the scale J at the highest rates of revolutions. The fingers $c$ $c$ indicate upon the scale J the rate of revolutions of the shaft A' at each instant that the disk C indicates upon the power-scale H the horse-powers transmitted by the shaft A' at that indicated speed. The loose collar E being hung upon the hub of the disk has the same right-line movement along the shaft A' as the disk C. A finger carrying a pen or pencil $e'$ may be screwed into the collar E to record continuously upon any proper surface to which the pen is applied the right-line movements of the disk C. The handle suspended from the collar E serves as a weight to prevent the collar from rotating with the shaft A' and also serves for adjusting the scale J to a position at right angles to the line of sight for precise reading.

Leaf-springs, as in Morins' rotary dynamometer, were formerly used, also spiral springs have been more recently used in transmitting-dynamometers and in flexible couplings, and such are not herein claimed. The spring F as here used is of volute form and gives special advantages in compact construction of the yielding couplings for a given transmitting capacity, because for a given longitudinal length of coiled spring a larger range of spring action and of rotative motion of the lugs $b$ $b'$ can be obtained than with other forms of compression or tension springs. The rectangular wire of the coil is tapered in width along its length, so as to have at all points uniform resistance to compression or tension throughout its effective length.

The coupling halves B B', Figs. 1, 6, and 7, may be cast similar to the standard split couplings, but with the additions of the lugs $b$ and $b'$. The lugs $b$ and $b'$ have proper apertures $o$ and $o'$, Fig. 6, for the passage of the spring-links $g$ $g$. Between each pair of coupling-lugs $b$ and $b'$ there is a suitable elastic cushion $q$ and $q$, Fig. 5. The end joint between the shafts A and A' is opposite the joint between the coupling halves B and B'. If A A' is a continuous shaft receiving power by belt from another shaft, then the belt-pulley B², Fig. 8, transmitting power to A, will be loose upon the shaft, but will have lugs $b$ $b$ cast upon its hub, with apertures $o$ $o$, said lugs mating with lugs $b'$ $b'$, and will be substituted for and serve the purpose of the coupling half B. In such case the stud $n$ may pass through a slot $t$ in the coupling half B', Fig. 8, and be screwed into the coupling half B. The stiff link $h$ and collar $i$ will not then be required. All the respective revolving parts of the couplings, springs, indicators, and their connections are balanced as respects centrifugal force, offer very slight frictional resistance, and are adapted to ordinary high rates of revolution.

The flexible couplings may have two or more transmitting-springs set at balancing intervals along the circumference, and the springs may be set at such distance from the axis of the shaft as circumstances shall require.

I claim as my invention—

1. The combination with a suitable shaft, and a coupling on said shaft, the parts of which are flexibly connected, of a sliding indicating-disk and lazy-tongs levers connecting said coupling and disk, and giving to the disk a right-line motion proportionate to the angular motion of the coupling-lugs, substantially as described.

2. The combination with a suitable shaft, and a coupling on said shaft, of a plurality of springs connecting the parts of said coupling, a sliding indicating-disk, and lazy-tongs levers connecting said coupling and disk and giving to the disk a right-line motion proportionate to the angular motion of the coupling-lugs, substantially as and for the purpose described.

3. The combination with a plurality of volute, tapered springs, and shaft coupling halves which said springs connect, of a sliding indicating-disk, and lazy-tongs levers connecting said coupling and disk, and giving to the disk a right-line motion proportionate to the angular motion of the coupling-lugs, substantially as described.

4. A plurality of volute springs, in combination with a like number of pairs of perforated lugs on a shaft coupling or pulley, which said springs flexibly connect, and with a sliding indicating-disk, and lazy-tongs levers connecting said coupling and disk, and giving to the disk a right-line motion proportionate to the angular motion of the coupling-lugs, substantially as described.

5. The combination with a suitable shaft, of a flexibly-connected coupling on said shaft, consisting of a loose pulley and slotted coupling half, each supplied with pairs of perforated lugs, and with springs which connect said pairs of lugs, and also of a sliding indicating-disk, and lazy-tongs levers connecting both halves of said coupling with said disk and giving to the disk a right-line motion proportionate to the angular motion of the coupling halves, substantially as and for the purpose described.

In testimony whereof I have hereunto set my hand, this 31st day of August, 1900, at Minneapolis, Minnesota.

JOHN T. FANNING.

In presence of—
A. C. PAUL,
M. E. GOOLEY.